United States Patent [19]

Allen

[11] Patent Number: 4,708,004
[45] Date of Patent: Nov. 24, 1987

[54] BICYCLE LOCK

[76] Inventor: Mark L. Allen, 1776 E. 13th St., Brooklyn, N.Y. 11229

[21] Appl. No.: 3,482

[22] Filed: Jan. 15, 1987

[51] Int. Cl.⁴ .............................................. B62H 5/14
[52] U.S. Cl. ....................................... 70/226; 70/228; 70/233; 70/236
[58] Field of Search ................. 70/228, 226, 225, 255, 70/233, 236; 188/24.11, 24.12, 24.18

[56] References Cited

U.S. PATENT DOCUMENTS

| | | | |
|---|---|---|---|
| 440,949 | 11/1890 | Fuller | 70/228 |
| 445,118 | 1/1891 | Krieger | 70/228 |
| 583,728 | 6/1897 | Brow | 70/228 |
| 735,113 | 8/1903 | Kelland | 188/24.18 |
| 897,926 | 9/1908 | Pedueasse | 70/228 |
| 1,242,848 | 10/1917 | Pale | 70/228 |

FOREIGN PATENT DOCUMENTS

| | | | |
|---|---|---|---|
| 333153 | 11/1903 | France | 188/24.18 |
| 557949 | 8/1923 | France | 188/24.18 |
| 444120 | 1/1949 | Italy | 70/228 |

*Primary Examiner*—Robert L. Wolfe
*Attorney, Agent, or Firm*—William P. Keegan

[57] ABSTRACT

A bicycle lock mounted on the bicycle which can be quickly actuated by a rider to immobilize the bicycle and prevent its being ridden away by a thief who has demanded surrender of the bicycle. The lock includes a manually operated member on the handlebar of the bicycle which is connected by a cable to the actual locking mechanism which when actuated immediately prevents a rotating member, e.g., a wheel, from rotating. The locking member, once removed to a locking position, can only be restored to a non-locking position when a key operated member is actuated to permit such restoration.

6 Claims, 12 Drawing Figures

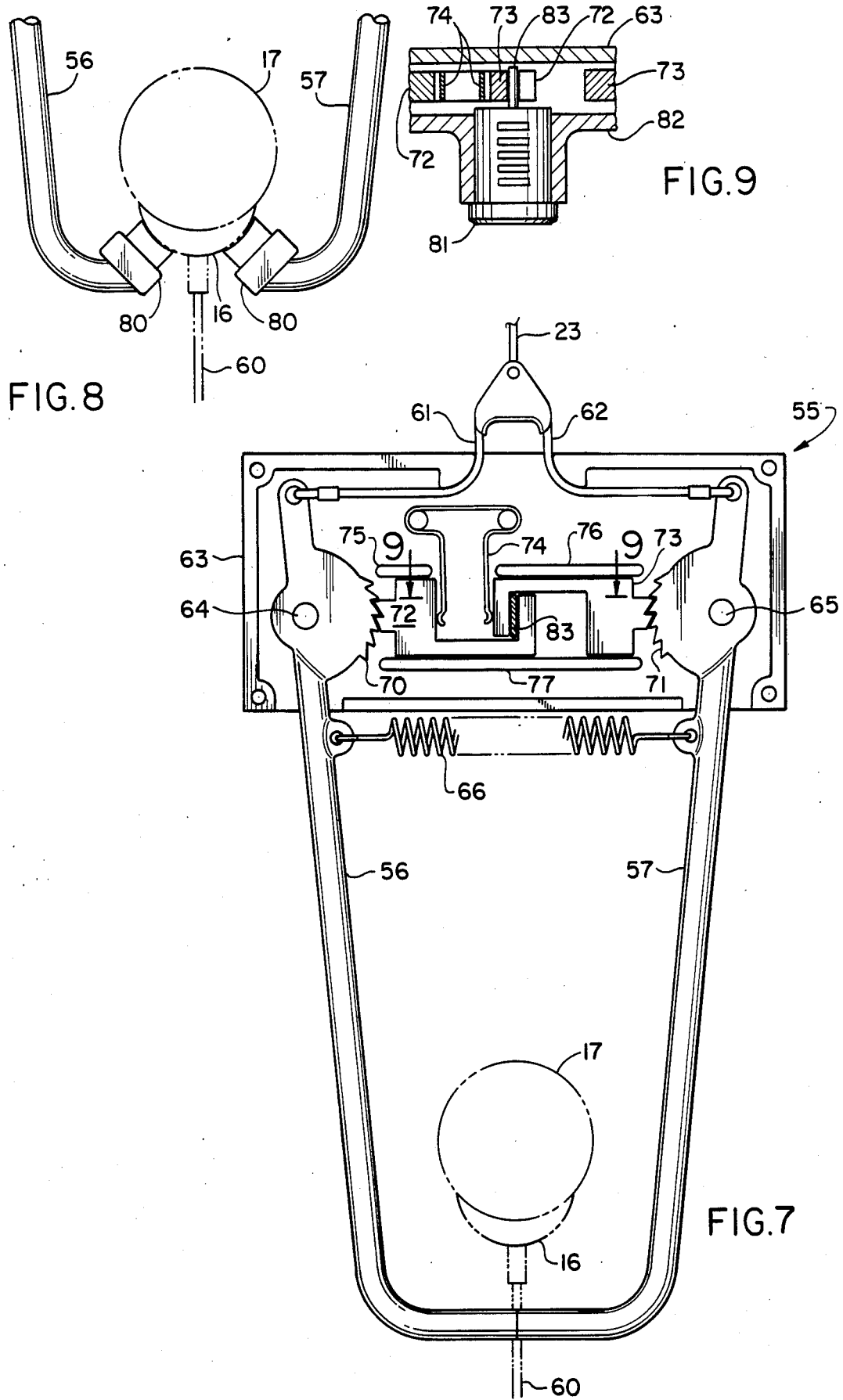

BICYCLE LOCK

BACKGROUND OF THE INVENTION

The use of bicycle locks to lock parked or stored bicycles is well known. Locks used for this purpose take many forms, such as padlocks with elongated shackles that encompass a bicycle part, e.g., a wheel or frame member, and an object to which the bicycle is locked, or locks in which the shackle is replaced by a chain or cable. The locks themselves may be key actuated or include a combination mechanism to open the lock. In any case, the user of the lock has ample time to open the lock, by key or combination mechanism, and lock a wheel to the bicycle frame in which event the bicycle cannot be ridden away although it could be carried away, or lock the bicycle frame to a stationary object in which event the bicycle cannot be ridden or carried away. The user can then leave the secured bicycle and return at a later time to unlock the bicycle for use.

However, there are situations in which the bicycle user does not have sufficient time to apply a lock as above described and secure the bicycle against theft, or more specifically, robbery. For example, it is not uncommon for a bicycle rider riding alone, especially a young or female rider, to be accosted by a person or qroup of persons who intimidates or threatens the rider with physical violence if he or she does not give up possession of the bicycle. Or the rider may be assaulted and knocked off the bicycle which is then stolen. Such robberies often occur in populated areas where, unbeknownst to onlookers who might otherwise frustrate the robbery or protect the victim, the robber simply rides away on the stolen bicycle simply because it cannot be quickly locked to prevent its use. Even in lonely areas a rider may wish to prevent his bicycle from being stolen and ridden away if he believes that he can escape injury by fleeing on foot and leaving an immobilized bicycle, but he is unable to do so because he cannot immobilize the bicycle by quickly locking it.

GENERAL DESCRIPTION OF THE INVENTION

It is an object of the invention to provide an improved bicycle lock.

It is another object of the invention to provide a bicycle lock that can be quickly actuated to lock the bicycle and prevent its use.

It is still another object of the invention to provide a bicycle lock that is manually triggered to the locked position and is reset to the unlocked position by a special tool, or a key or combination lock.

It is yet another object of the invention to provide a spring biased bicycle lock that is manually triggered to the locked position where it is maintained by a detent mechanism and that can be reset to the unlocked position when a key or combination lock deactivates the detent mechanism to permit restoration of the bicycle lock to its unlocked position.

In carrying out the invention, a locking member is spring biased to a detented locking position in which it prevents rotation of a bicycle wheel or sprocket. The locking member is ordinarily maintained in an unlocked position by a manually triggered detent mechanism that prevents spring biased movement of the locking member. Once the locking member is spring biased to the locking position where it is held by a detent, it can only be reset to the unlocked position when a special tool or a key or combination mechanism frees the locking member from the detent.

Features and advantages of the invention may be gained from the foregoing and from the description of a preferred embodiment thereof which follows.

DESCRIPTION OF THE DRAWING

FIG. 7 is a view similar to FIG. 6, but showing the second embodiment of the lock in its operated or locked condition;

FIG. 8 is a fragmentary view showing an alternated arrangement in which the lock functions as a brake on the bicycle;

FIG. 9 is a sectional view taken along line 9—9 of Fig. 7; and

DETAILED DESCRIPTION OF THE INVENTION

Figures 1, 2, 3, 4:
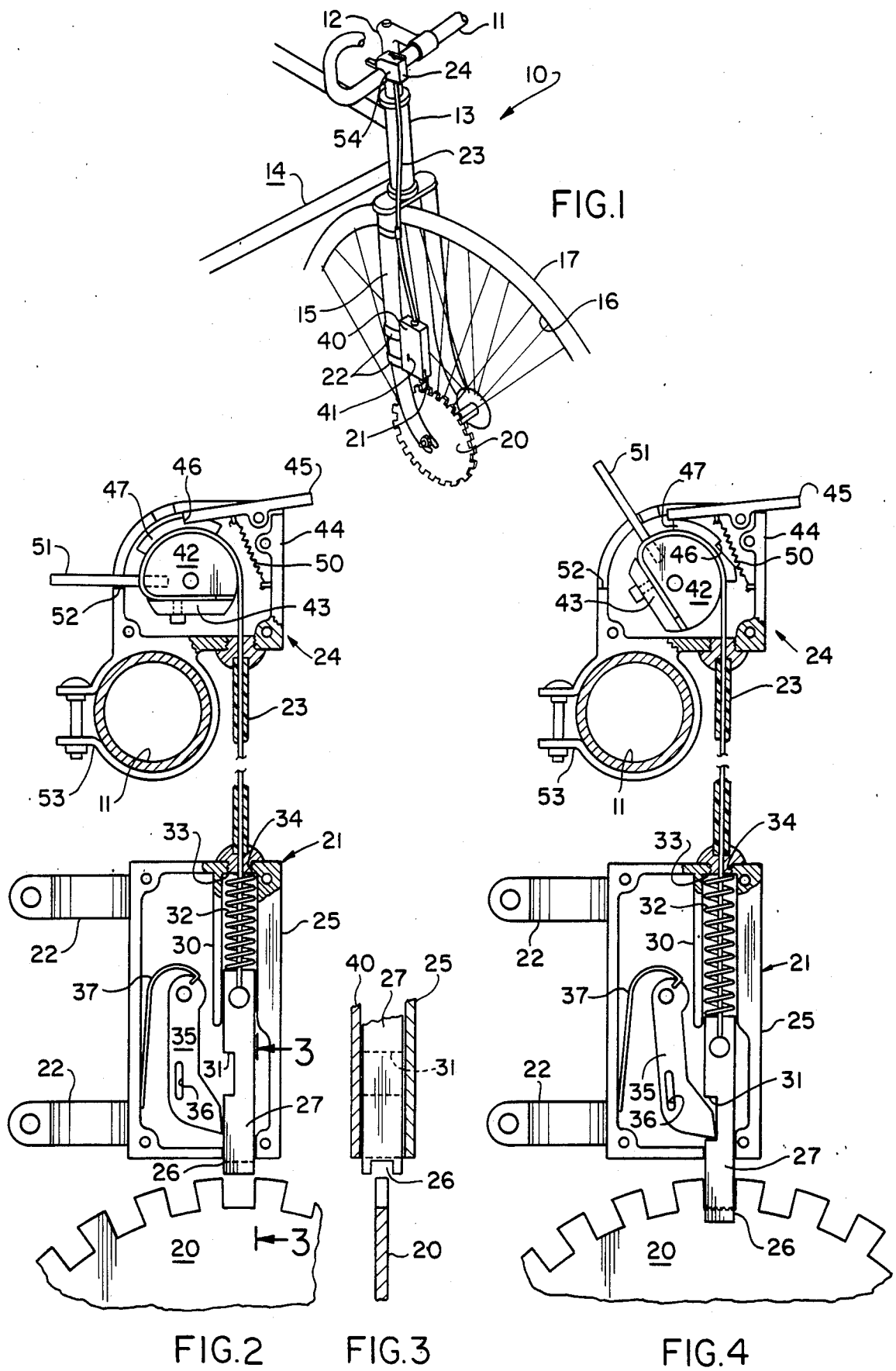
Fig. 1 a fragmentary perspective view showing one embodiment of the bicycle lock of the present invention mounted on a bicycle.
FIG. 2 a fragmentary front elevational view, with parts removed, showing the bicycle lock in its standby or unlocked condition.
FIG. 3 is a fragmentary view taken along line 3—3 of FIG. 2 showing a of the locking bolt of the lock.
FIG. 4 is a view similar to FIG. 2 but showing the bicycle lock in its operated or locked condition.

FIG. 1 shows a conventional bicycle 10 in which handlebars 11 are connected to a rotatable stem 12 that is connected to the head tube 13 of frame 14 which in turn is connected to the front wheel fork 15. A spoked wheel 16 is rotatablY mounted at the fork tips and a tubular tire 17 is mounted on the wheel. A notched disk 20 is secured on wheel 16 for rotation therewith. The bicycle lock 21 of the present invention is shown secured to the right blade of front wheel fork 15 by clamps 22. A cable 23 leads from lock 21 to the triggering-reset mechanism 24 which is mounted on handlebars 11. Mechanism 24 could just as well be mounted on the bicycle frame in any location convenient for operation by a bicycle rider.

The lock 21 and the triggering-reset mechanism 24 are shown in detail in FIG. 2. Lock 21 includes a housing 25 having a bottom aperture 26 through which a bolt 27 projects. The bolt is guided for sliding motion by aperture 26 an internal housing partition 30. As shown bolt 27 is provided with a notch 31 and urged downwardly (in FIG. 2) by a compression spring 32 that extends between bolt 27 and a shoulder 33 formed around the top aperture 34 of housing 25. Within housing 25, a latch 35 having a slot 36 provided therein is biased for counterclockwise pivotal movement around pin 36 by a flat spring 37. A cover plate 40 having slot 41 therein that aligns with latch slot 36 is fastened to housing 25 and secures the mechanism just described.

One end of cable 23 is connected to bolt 27 while the other end of the cable is secured to the windlass 42 by clamping device 43. Windlass 42 is pivotally mounted in housing 44 of mechanism 24 and is urged in a clockwise direction by lock spring 32 which through bolt 27 pulls on cable 23. However, clockwise rotation of windlass 42 is prevented by pivotally mounted trigger member 45 which engages the notch 46 in a detent plate 47 secured to the windlass and rotatable therewith. A small tension spring 50 urges trigger member 45 into notch 46. A reset crank 51 extending through slot 52 in housing 44 and into windlass 42 is provided to rotate the windlass against the bias of spring 32 into the position shown in FIG. 2 wherein trigger member 45 can engage notch 46 of detent plate 47.

Housing 44 is fastened to handlebars 11 by an integral clamp 53 and is provided with a cover plate 54 that is screwed to the housing.

In normal operation, lock 21 and triggering-reset mechanism 24 are in the positions shown in FIG. 2. The bicycle can be ridden in the usual way with no interference from lock 21, notched disk 20 rotating with wheel 16. However, if the rider is accosted and a demand made that he give up possession of the bicycle, he can thwart such a theft by simply pivoting trigger member 45 in a clockwise direction to lift the end thereof out of notch 46. Immediately bolt 27 is driven downwardly under the urging of spring 32 into engagement with one of the notches in disk 20 thereby incapacitating the bicycle and preventing its being ridden away by the thief. It will be noted (FIG. 3) that the lower end of bolt 27 is bifurcated so that when it engages a notch in disk 20 clamps 22 cannot be bent to pivot housing 25 about the fork blade and bolt 27 out of engagement with disk 20. When bolt 27 is driven downwardly, latch 35, under the urging of spring 37, pivots into engagement with bolt notch 31 thereby preventing withdrawal of bolt 27 from engagement with disk 20. In order to disengage bolt 27 from disk 20 and thereby free wheel 16 for normal rotation, a screwdriver or other suitable tool has to be inserted through slot 41 in cover plate 40 and into slot 36 provided in latch 35. The latch is then pivoted clockwise out of engagement with bolt notch 31 thereby permitting upward movement of bolt 27 when reset crank 51 is pivoted counterclockwise from the position shown in FIG. 4 to that shown in FIG. 2 to rotate windlass 42 and pull on cable 23 thereby withdrawing bolt 27 from engagement with disk 20. Upon crank 51 and detent 47 being returned to the positions shown in FIG. 2, trigger member 45 will drop into notch 46 to thereby retain bolt 27 in its withdrawn position.

Latch 35 could be pivoted clockwise out of engagement with notch 31 to permit resetting of lock 21 by a key or combination operated tumbler mechanism. Also, it should be understood that lock 21 may be positioned such that bolt 27 projects through a pedal sprocket or between the spokes of wheel 16 to prevent normal use of the bicycle.

Figure 5:
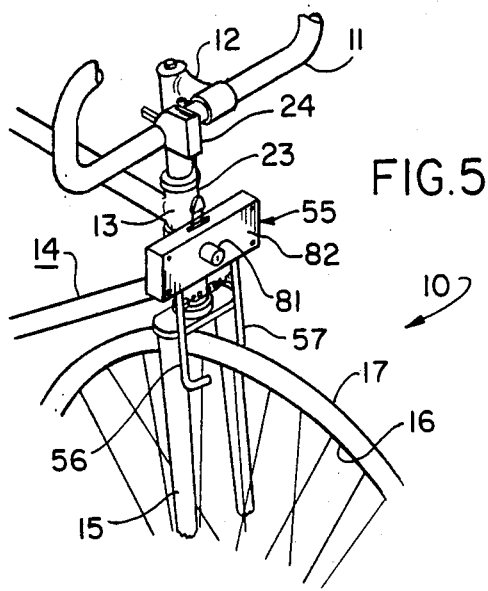
FIG. 5 is a view similar to FIG. 1 but showing a second embodiment of the invention.
Figure 6:
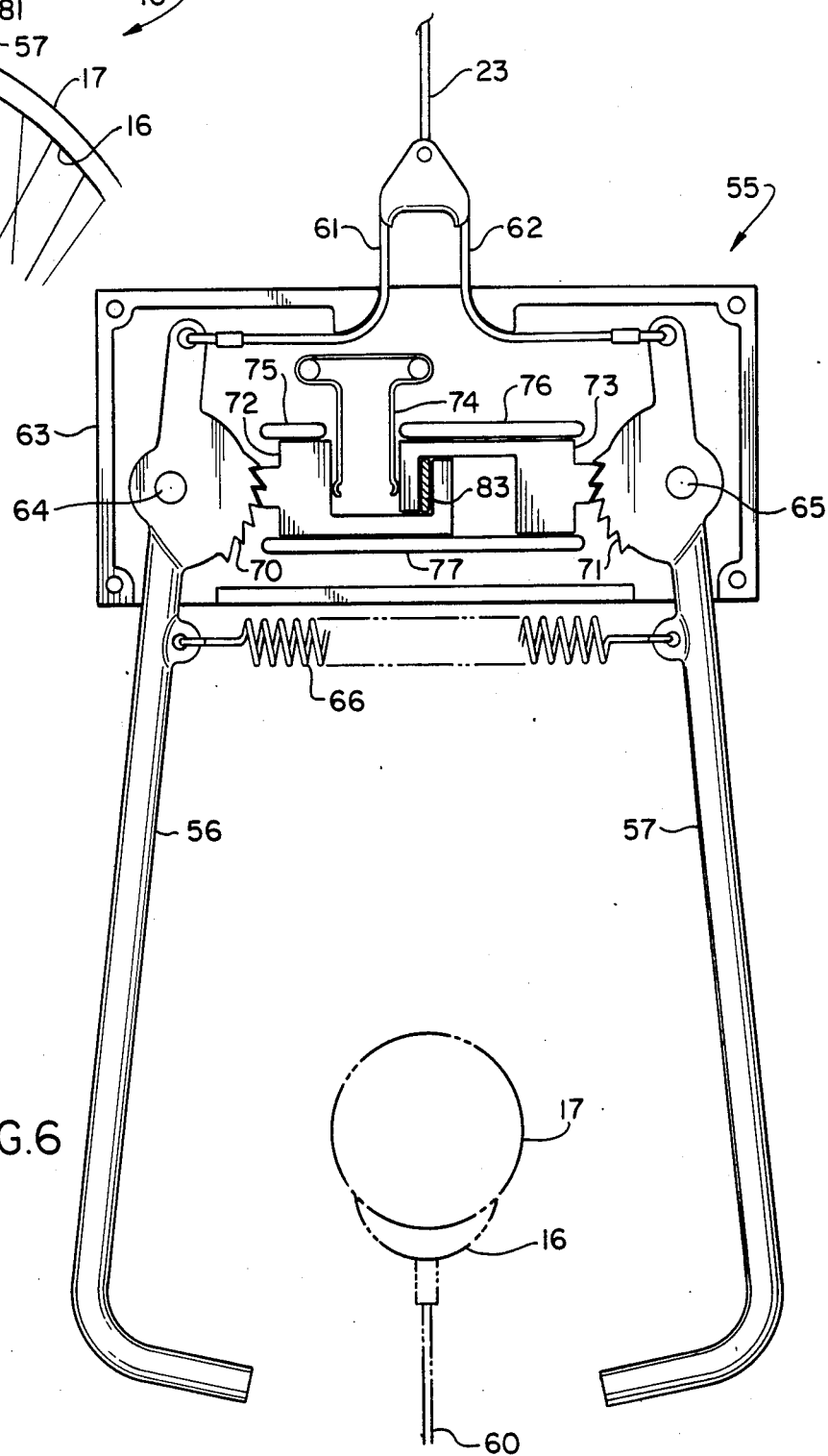
FIG. 6 is a fragmentary front elevational view, with parts removed, showing the second embodiment in its standby or unlocked condition.

Attention is now directed to FIGS. 5, 6, and 7 in which a caliper type embodiment of the lock is disclosed. The bicycle shown in FIG. 5 is the same as that shown in FIG. 1 and, therefore, the drawing (FIG. 5) is provided with the same reference numerals. The triggering-reset mechanism 24 is also the same and will not be described again. The caliper type bicycle lock 55 is shown mounted on head tube 13 with locking members 56 and 57 extending downwardly on opposite sides of wheel 16 to a point below the rim of the wheel and adjacent spokes 60. Lock 55 is connected to mechanism 24 by cable 23 which, because two locking members or bolts have to be actuated, is divided, in effect, into two cables 61 and 62.

Lock 55 comprises a housing 63 in which locking members 56 and 57 are pivotally mounted on shafts 64 and 65, respectively. The members are two counter-rotating levers, the lower ends of which are biased into engagement with each other (FIG. 7) by tension spring 66. Each member 56 and 57 is provided with a ratchet section 70 and 71 that is engaged by a pawl member, 72 and 73, respectively, that is resiliently biased to slide into engagement with a ratchet section by spring 74. The sliding movement of pawl members 72 and 73 is guided by rails 75, 76, and 77 provided in housing 63. It will be clear from the drawing (FIG. 6) that when cable 23 is released by actuating trigger member 45 of mechanism 24 (operating as described when discussing the FIGS. 1, 2, and 4 embodiment of the invention), spring 66 will pivot member 56 counterclockwise and member 57 clockwise thereby pulling cable 23 downwardly as shown in FIG. 7. During such movement, pawls 72 and 73 will slide rightwardly and leftwardly, respectively, as the ratchet sections of members 56 and 57 pass under them, only to be biased by spring 74 back into position to prevent a reverse movement of members 56 and 57. See FIG. 7. When lock 55 is triggered for operation by actuation of trigger member 45, the locking members 56 and 57 will be pivotted as just described so that their lower extremities will engage each other to block passage of the wheel spokes 60 therebetween thus preventing rotation of wheel 16 and riding of the bicycle.

It is clear that lock 55 could comprise a single locking member, e.g., member 56, that pivots far enough to extend well past the plane of spokes 60 to prevent rotation of wheel 16 and operation of the bicycle. In such case, the trigger member 45 could be located within housing 63 and biased into engagement with a notch formed in locking member 56. The trigger member would then be operated by Cable (similar to the well known cable joining the hand lever and caliper brake on bicycles equiped with hand operated brakes) connecting the member to an actuating handle mounted on the bicycle handlebars in a location quickly accessible to a bicycle rider. To reset such a lock, locking member 56 would be pivoted to its inoperative or non-locking position by directly pivoting the member rather than by pulling on it through a cable such as cable 23.

Again considering lock 55 as including two locking members 56 and 57, an alternative embodiment of the lock would provide the lower extremities of member 56 and 57 could be with brake pads 80 that engage the rim of wheel 16 in a braking relationship that prevents riding of the bicycle. See FIG. 8.

In operation, lock 55 will be in the condition shown in FIG. 6 and the triggering-reset mechanism 24 in the condition shown in FIG. 2. When trigger member 45 is actuated to free windlass 42 for movement to the position shown in FIG. 4, spring 66 will move cable 23 and lock 55 components to the position shown in FIG. 7. To reset or open lock 55 to enable normal use of the bicycle, a key (or combination) operated lock 81 mounted in cover plate 82 is provided to pivot lock tongue 83 in a counterclockwise direction. When the tongue is pivoted to a horizontal position, pawls 72 and 73 will slide, against the bias of spring 74, out of engagement with the associated ratchet sections of locking members 56 and 57. With members 56 and 57 thus free for movement, crank 51 can be actuated to pull upwardly on cable 23 and thus move members 56 and 57 from the positions shown in FIG. 7 to those shown in FIG. 6 at which time trigger member 45 will engage notch 46 in detent plate 47 to thus keep the lock members in their open position. Lock 81 can then be actuated to restore tongue 83 to its vertical position and thus allow spring 74 to bias pawls 72 and 73 into engagement with the ratchet sections of members 56 and 57.

Figure 10:
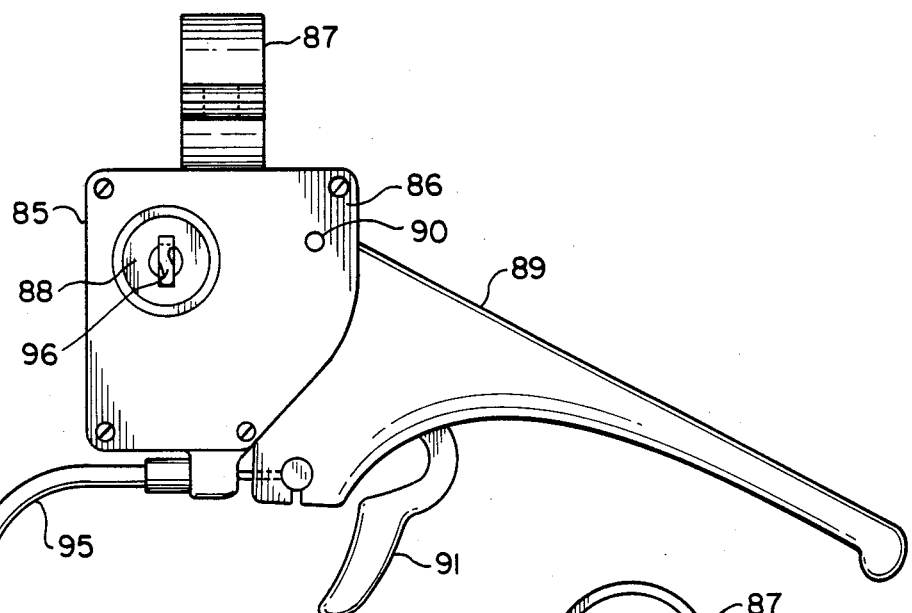
FIG. 10 is a schematic front elevational view showinq another embodiment of the invention.
Figure 11:
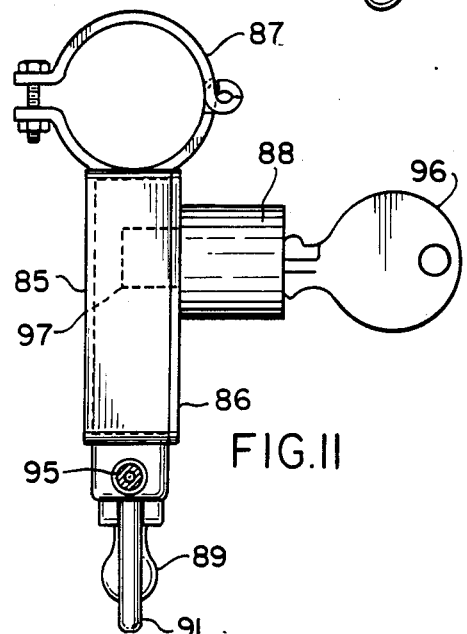
FIG. 11 is a side elevational view of the FIG. 10 embodiment.
Figure 12:
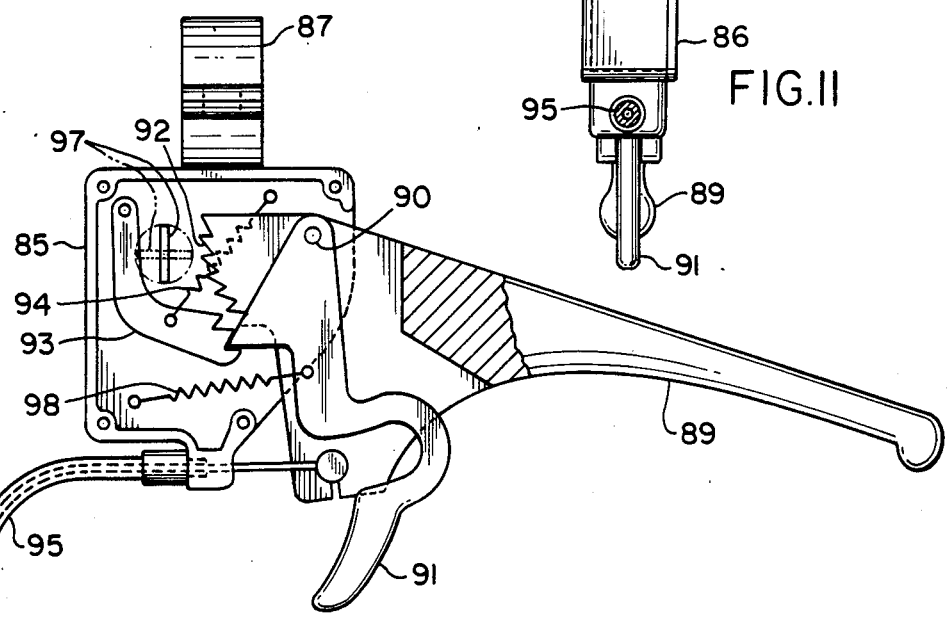
FIG. 12 is a view similar similar to FIG. 10, but with a part removed.

The embodiment of the lock shown in FIG. 8 suggests that a quickly operated lock such as described herein might be further embodied in the hand set caliper brake commonly used on bicycles. For example, the hand lever housing and hand lever of a conventional hand operated caliper brake would be modified as shown in FIGS. 10 to 12. The modified components may be applied to the front wheel brake or to the rear wheel brake, or to both brakes.

A lever housing 85 having a removable cover plate 86 is shown provided with a clamp 87 by which the housing is mounted on the handlebars 11 of a bicycle. A key actuated cylinder 88 that will be described herinafter is also provided on coverplate 86. Within housing 85, the hand lever 89 is pivotally mounted on pivot pin 90, as is trip member 91. The end of lever 89 within housing 85 is formed with a ratchet 92 that when engaged by pawl 93 prevents clockwise movement of lever 89. Pawl 93, which is biased by spring 94 into engagement with ratchet 92, is normally held out of such engagement by spring biased trip member 91. Thus, hand lever 89 can operate the bicycle caliper brake in the normal fashion by pulling on brake cable 95. As is known, when the braking force is released from lever 89, the caliper brake spring restores the brake arms and the hand lever 89 to the non-braking position. However if trip member 91 is actuated to permit pawl 93 to engage ratchet 92, the caliper brake spring will not be able to unlock the brake because lever 89 will be held in its operated position holding cable 95 taut and the brake applied to the bicycle wheel. In a situation where the bicycle rider wants to lock the bicyle by applyinq the brake, he will simply actuate trip member 91 to release pawl 93. This can be done before lever 89 is actuated to apply the brake, or after lever 89 is actuated provided a braking force is maintained on lever 89 until pawl 93 engages ratchet 92. To release the brake, which is now functioning as a lock, the key operated cylinder 87 is provided. When the key 96 is rotated, the cylinder tongue 97 is turned from a vertical orientation to a horizontal position to pivot pawl 93 out of engagement with ratchet 92 whereupon the trip member 91 is biased by spring 98 to the position shown in FIG. 12. In this position, as previously mentioned, it prevents pawl 93 from engaging ratchet 92. Key 96 will then be rotated to restore cylinder tongue 97 to its normal vertical orientation, thus enabling trip member 91 to be actuated to release pawl 93 for enqaqement with ratchet 92 when the occasion requires such action.

Having thus described the invention, it is to be understood that many apparent changes and embodiments of the invention could be made without departing from its spirit and scope. For example, in the FIGS. 10 to 12 embodiment, trip member 91 could be eliminated so that the resulting assembly would function only as a lock and not as the usual caliper brake having a capability of also serving as a lock. With such a modified construction the "caliper lock" might replace a front wheel caliper brake and the brake system for such an equipped bicycle would consist simply of the rear wheel caliper brake. Or, a second lever provided with a ratchet that is locked in an operated locking position by a spring biased pawl (similar to handle lever 89 and pawl 93 in FIG. 12 without trip mechanism 91) could be added to a conventional hand lever operated caliper brake. In such an embodiment the second lever would be mounted adjacent the standard caliper brake hand lever which would operate in the usual fashion to brake the bicycle. Upon release the brake hand lever and the caliper brake would be restored to their non-braking position by the caliper brake spring, again in the usual fashion. If it is desired to immobilize the bicycle by locking the brake in a braking position the second hand lever would be operated by squeezing it as one applies the standard caliper brake by squeezing the brake hand lever. An abutment formed on the second hand lever would engage the standard brake hand lever and thus move it to the braking position. When the second hand lever moves the standard brake hand lever to the braking position and thus applies the caliper brake to lock the bicycle wheel, e.g., the front wheel, the second hand lever will be secured in this position by the spring biased pawl associated with its ratchet. Of course, the standard brake hand lever will thus also be locked in the braking position. The second hand lever will be released for restoration to a non-locking position by a key operated member disengaging the pawl from the second hand lever ratchet. A spring would return the second hand lever to its non-locking position. The caliper brake spring would simultaneously restore the caliper brake and its operating hand lever to their non-braking position. It is also to be understood that when the term key means, key operated means or key operated member is used in this specification or in the claims the term is intended to include a member actuated by a combination lock or a special tool as well as by a key cylinder. Therefore the foregoing specification and the accompanying drawing are to be interpreted as illustrative rather than in a limiting sense.

What is claimed is:

1. A quick action bicycle lock adapted for mounting on a bicycle to permit immediate immobilization of the bicycle, said block comprising: a caliper brake for engaging a bicycle wheel to prevent rotation of the wheel; hand lever means mounted on the bicycle handlebar and connected to said caliper brake by a brake cable, said hand lever means being formed with a ratchet thereon; pawl means for engaging said ratchet to secure said hand lever means in its brake applying position; spring means for biasing said pawl means into engagement with said ratchet; trigger means for holding said pawl mean out of engagement with said ratchet so that said hand lever means can move freely between a brake applying and a non-brake applying position, said trigger means being movable to a non-holding position whereby said pawl means is free to engage said ratchet; and key operated means for disengaging said pawl mean from said ratchet to allow said hand lever means to return to its non-brake applying position.

2. A quick action lock according to claim 1 including spring means to return said trigger means to the position wherein it holds said pawl means out of engagement with said ratchet when said key means disengages said pawl means form said ratchet.

3. A quick action bycycle lock that enables immediate immoblization of a bicycle on which the lock is mounted, said lock comprising: locking means movable between a locking position wherein it prevents operation of the bicycle and a non-locking position, said locking means including caliper type brake means for locking a wheel of the bicycle, said caliper brake means being spring biased to a non-locking position; hand lever means for moving said brake means to a wheel locking position; spring biased pawl means to secure said brake means in its locking position; trigger means for maintaining said pawl means out of its securing position, said trigger means being operable to release said pawl means for spring biased movement into its securing position; and key means operable to move said pawl means out of its securing position and permit restoration of said brake means to its non-locking position.

4. A quick action bicycle lock according to claim 3 wherein said hand lever means is provided with a ratchet segment, and wherein said pawl means is spring biased towards engagement with said ratchet segment, and including spring means for biasing said trigger means to a position wherein it maintains said pawl means out of engagement with said ratchet segment.

5. A quick action bicycle lock that enables immediate immobilization of a bicycle on which it is mounted, said lock comprising: a locking member movable between a locking position wherein it prevents operation of the bicycle by preventing rotation of a bicycle component that normally rotates when the bicycle is in use and a non-locking position, said locking member normally being in a non-lcoking position; spring means for biasing said locking member to a locking position; means for moving said locking member to a non-lcoking position and maintaining it there until the bicycle is to be locked, said means comprising a movable member adapted to be mounted on a bicycle handlebar and movable between a first and a second position, cable means connecting said movable member to said locking member whereby said locking member can be moved to a non-locking position against the biased of said spring means by moving said movable member to its first position, detent means for holding said member in said first position, said detent means being releasable to allow said spring means to move said locking member to its locking position and said movble member to its second position; spring biased pawl means for engaging said locking member in its locking position to prevent its movement to a non-locking position; and key means for disengaging said pawl means from said locking member to permit and said locking member to be moved to a non-locking position by moving said movable member to its first position.

6. A quick action bicycle lock according to claim 5 including additional spring means for biasing said detent means into engagement with said movable member to hold said member in its first position.

* * * * *

UNITED STATES PATENT AND TRADEMARK OFFICE
CERTIFICATE OF CORRECTION

PATENT NO. : 4,708,004

DATED : November 24, 1987

INVENTOR(S) : Mark L. Allen

It is certified that error appears in the above-identified patent and that said Letters Patent is hereby corrected as shown below:

```
In the ABSTRACT, line 9, change "removed" to --- moved ---
Col. 2, line 15, after "showing a" insert --- detail ---
        line 45, change "rotatablY" to --- rotatably ---
        line 66, after "having" insert --- a ---
Col. 3, line 49, after "detent" insert --- plate ---
Col. 4, line 41, change "Cable" to --- a cable ---
Col. 5, line 58, change "enqaqement" to --- engagement ---
Col. 6, line 45 (Claim 1), change "block" to --- lock ---
        line 66 (Claim 2), change "form" to --- from ---
        line 67 (Claim 3), change "bycycle" to --- bicycle ---
Col. 8, line 11 (Claim 5), change "biased" to --- bias ---
        line 16 (Claim 5), change "movble" to --- movable ---
```

Signed and Sealed this

Twenty-sixth Day of July, 1988

Attest:

DONALD J. QUIGG

*Attesting Officer*    *Commissioner of Patents and Trademarks*